No. 786,597. Patented April 4, 1905.

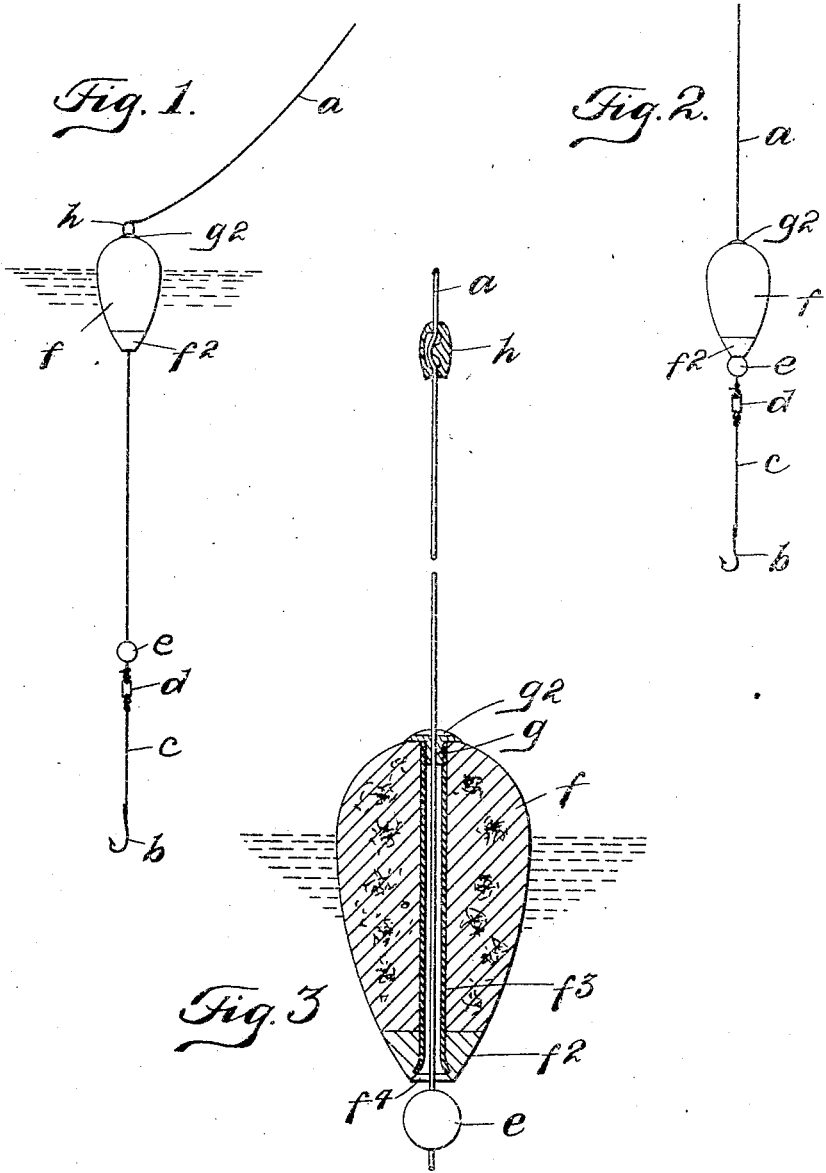

UNITED STATES PATENT OFFICE.

HELEN A. PICKEN, OF NEW YORK, N. Y.

FISHING LINE AND FLOAT.

SPECIFICATION forming part of Letters Patent No. 786,597, dated April 4, 1905.

Application filed July 5, 1904. Serial No. 215,223.

*To all whom it may concern:*

Be it known that I, HELEN A. PICKEN, a citizen of the United States, residing at New York, in the county of New York and State of New York, have invented certain new and useful Improvements in Fishing Lines and Floats, of which the following is a specification, such as will enable those skilled in the art to which it appertains to make and use the same.

This invention relates to fishing lines and floats; and the object thereof is to provide improved means for connecting the float with the line whereby the amount of line below the float may be regulated at all times and whereby the line is free to move through the float within certain limits, so as to easily regulate the depth at which it is desired to fish and so as to facilitate the casting or throwing of the line.

The invention is fully disclosed in the following specification, of which the accompanying drawings form a part, in which the separate parts of my improvement are designated by suitable reference characters in each of the views, in which—

Figure 1 is a side view showing the position of the float and hook when both are in the water; Fig. 2, a similar view showing the position of the float and hook when both are out of the water; and Fig. 3, a similar view in section, showing the position which the parts assume in the operation of drawing the hook out of the water.

In the drawings forming part of this specification I have shown at $a$ an ordinary fish-line with which is connected a hook $b$, the hook being provided with a leader $c$, which is connected with the line at $d$ by means of a swivel-joint or in the usual manner; but my invention does not relate in any way to the method of connecting the hook with the line. The line $a$ above the connection of the hook $b$ therewith at $d$ is provided with the usual sinker $e$, which may be secured thereto in any desired manner, and mounted on the line above the sinker $e$ is a float $f$.

The float $f$ is of the usual general form, being larger at the top than at the bottom; but in my improvement the float is provided at its lower end with a weight $f^2$, having a tube $f^3$, which passes longitudinally through the body portion of the float and the upper end of which is closed by a screw-threaded plug $g$, having a head $g^2$ similar to that of an ordinary screw-head. The line $a$ passes loosely through the plug $g$ and also loosely through the float $f$, and said float is free to move freely on said line, the sinker $e$ being sufficient to pull the line through the float when the latter rests on or in the water, and the opening through the bottom part $f^2$ of the float through which the line passes is preferably slightly enlarged, as shown at $f^4$.

Mounted on and movable on the line $a$ is a slide $h$, which may be composed of any desired material and which may consist of an ordinary knot formed by tying a piece of cord to the line $a$. The slide $h$ limits the downward movement of the line through the float $f$ when the latter is resting in the water, and by means of this construction the depth at which it is desired to fish or the distance between the hook $b$ and the float $f$ may be regulated at all times, and said float when the line is withdrawn from the water slides freely downwardly and rests upon the sinker $e$, as shown in Fig. 2.

The weighted bottom $h^2$ of the float serves to hold the float in an upright position when in the water, and when the float is resting on the sinker $e$ the line may be cast or thrown to any desired point without inconvenience or danger to the operator, and as soon as the float and hook strike the water the line passes freely through the float and the float and line assume the position shown in Fig. 1, and this movement of the line through the float is limited by the slide $h$.

It will be understood that when the body portion of the float $f$ becomes worn or injured a new float may be conveniently and easily provided by removing the plug $g$ and detaching the body portion of the float from the tube $f^3$ and substituting a new body portion therefor.

By my improvement I provide means for facilitating the casting or throwing of the line and also for conveniently regulating the depth at which it is desired to fish, and other advantages will readily suggest themselves to those familiar with the operation of this class of devices, and it will be apparent that this improvement may be applied to hooks and lines whenever and wherever desired.

Having fully described my invention, what I claim as new, and desire to secure by Letters Patent, is—

1. A fishing-line provided with a float which is freely movable thereon and a slide mounted on the line above the float and adjustable thereon, substantially as shown and described.

2. A fishing-line provided with a float through which the line is free to move, said line being provided with a sinker and a hook below the float and with an adjustable slide above the float, substantially as shown and described.

3. A fishing-float of the usual form and provided with a longitudinal bore or passage, a weight secured in the bottom of said float and through which the bore or passage passes, and a detachable plug secured in the top of said bore or passage and through which the line is loosely passed, substantially as shown and described.

4. A fishing-float of the usual form, said float being weighted at the bottom and being provided with a longitudinal central bore which is large enough to permit a line to pass loosely therethrough, and a line provided with devices above and below the float to limit the movement thereof through the float, the device above the float being adjustable on the line.

5. A fishing-float of the usual form, said float being composed of a body portion having a weight at the bottom, the weight being provided with a tube which passes through the float and through said weight and which is large enough to permit a line to pass loosely therethrough, the upper end of the tube being closed by a plug having a head and through which the line may also be passed, substantially as shown and described.

6. A fishing-float of the usual form, said float being composed of a body portion having a weight at the bottom, the weight being provided with a tube which passes through the float and through said weight and which is large enough to permit a line to pass loosely therethrough, the upper end of the tube being closed by a plug having a head and through which the line may also be passed, the weight and tube being removable from the float, substantially as shown and described.

In testimony that I claim the foregoing as my invention I have signed my name, in presence of the subscribing witnesses, this 1st day of July, 1904.

HELEN A. PICKEN.

Witnesses:
 JOHN A. PICKEN,
 FRED HULBERG.